W. A. PITT.
POWER TRANSMITTING DEVICE.
APPLICATION FILED MAR. 18, 1918.

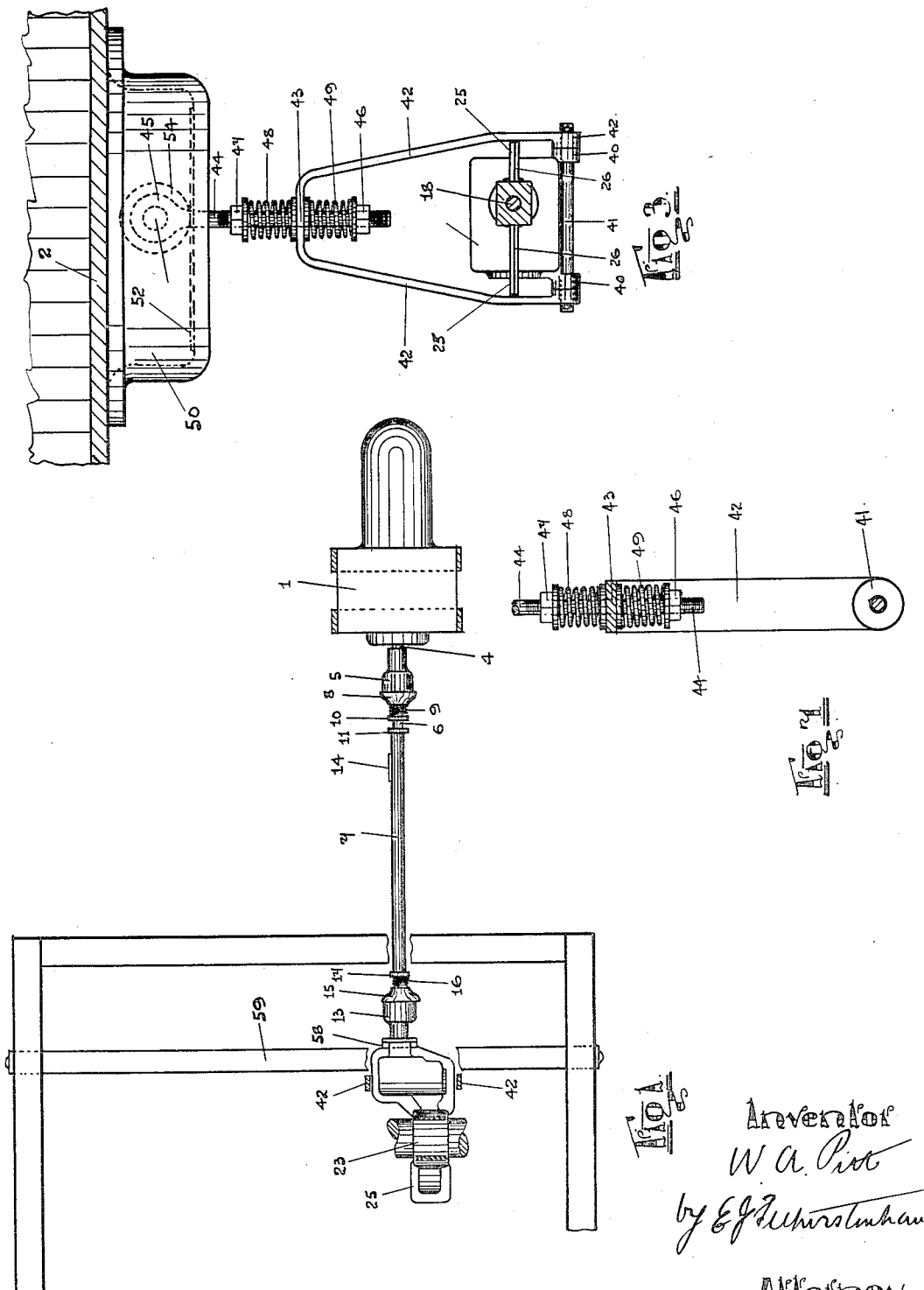

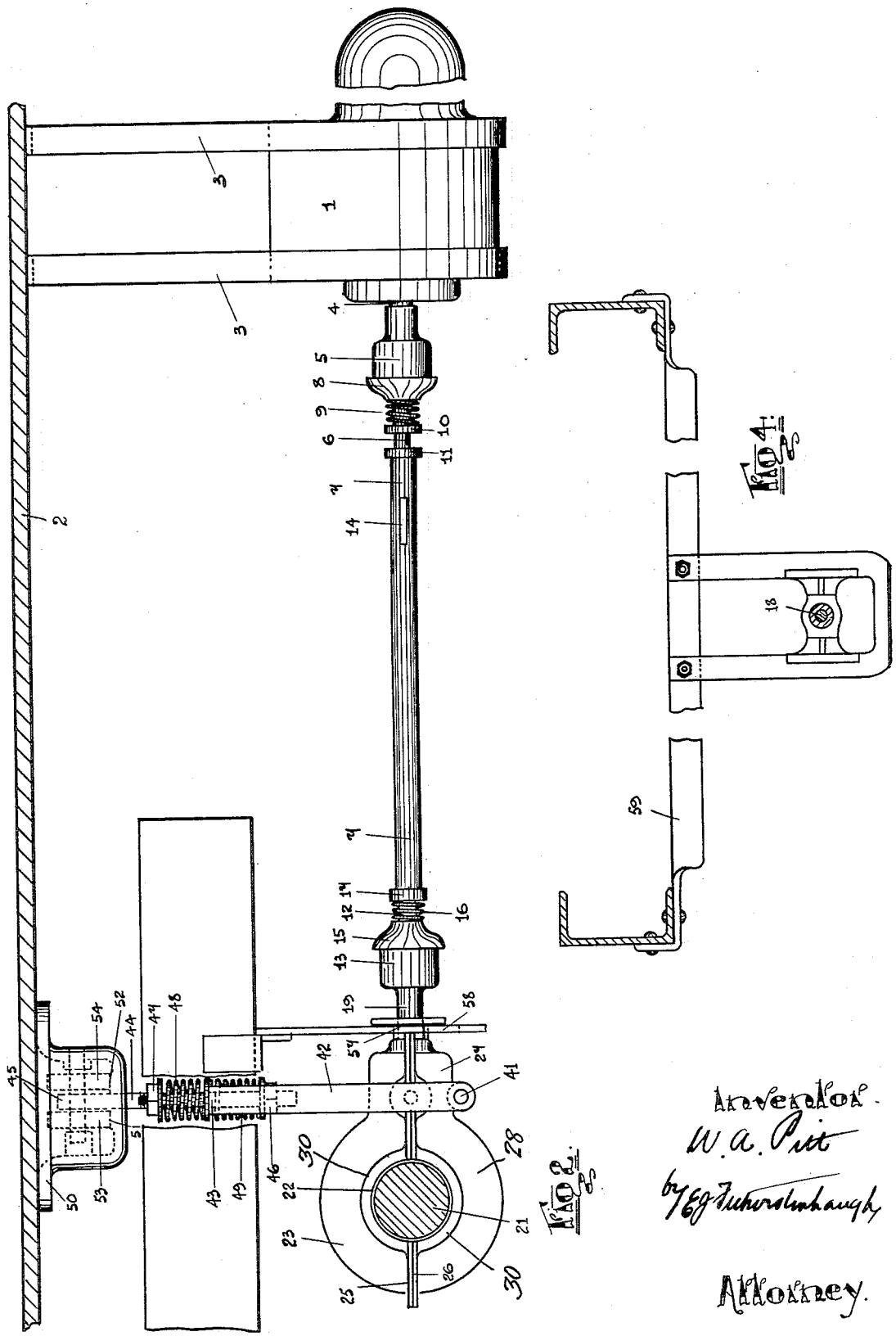

1,288,173.

Patented Dec. 17, 1918.
3 SHEETS—SHEET 3.

Inventor
W. A. Pitt
by E J Fairbrother
Attorney

UNITED STATES PATENT OFFICE.

WILLIAM ALEXANDER PITT, OF MONTREAL, QUEBEC, CANADA.

POWER-TRANSMITTING DEVICE.

1,288,173.   Specification of Letters Patent.   Patented Dec. 17, 1918.

Application filed March 18, 1918.   Serial No. 223,228.

*To all whom it may concern:*

Be it known that I, WILLIAM ALEXANDER PITT, a subject of the King of Great Britain, and resident of 19 Rushbrooke street, in the city and district of Montreal, in the Province of Quebec, in the Dominion of Canada, have invented certain new and useful Improvements in Power-Transmitting Devices, of which the following is the specification.

The invention relates to improvements in power transmitting devices as described in the present specification and illustrated in the accompanying drawings that form part of the same.

The invention consists essentially in the novel means employed for flexibly supporting the driving mechanism from the truck frame and other details of construction.

The objects of the invention are to devise an efficient means of transmitting the power developed by the running gear of a vehicle to a generator of electric current supported from the body of vehicle to eliminate the deterioration of the generator due to the jarring, jolting and vibration of the running gear and generally to provide a comparatively cheap mechanism of both serviceable and durable construction.

In the drawings, Figure 1 is plan view of a portion of a car truck showing the generator and the transmission from the car axle to said generator.

Fig. 2 is a side elevation of the same parts shown in Fig. 1 with the car axle in cross section.

Fig. 3 is an enlarged front view of the pinion case support.

Fig. 4 is an enlarged front view of the shaft guiding frame.

Fig. 7 is a vertical sectional view of the pinion case support.

Like numerals of reference indicate corresponding parts in each figure.

Figure 5:
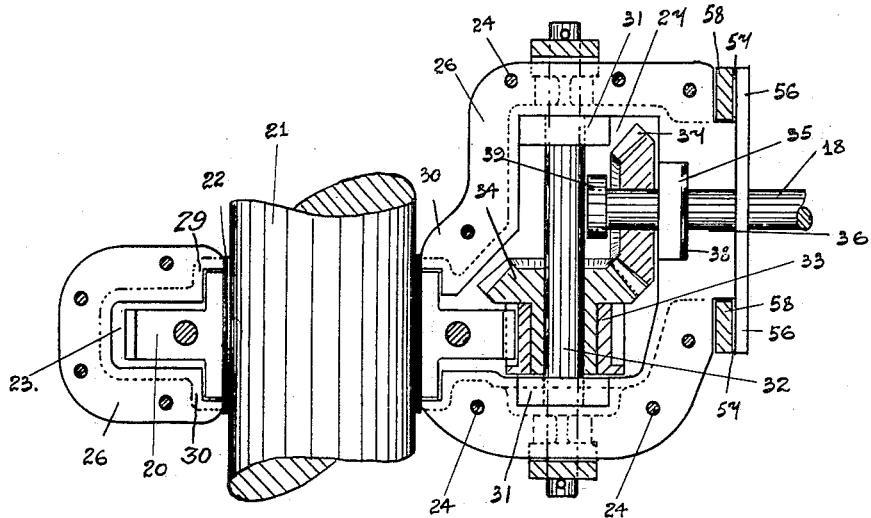
Fig. 5 is an enlarged sectional view showing the gear drive and the supports in section.
Figure 6:
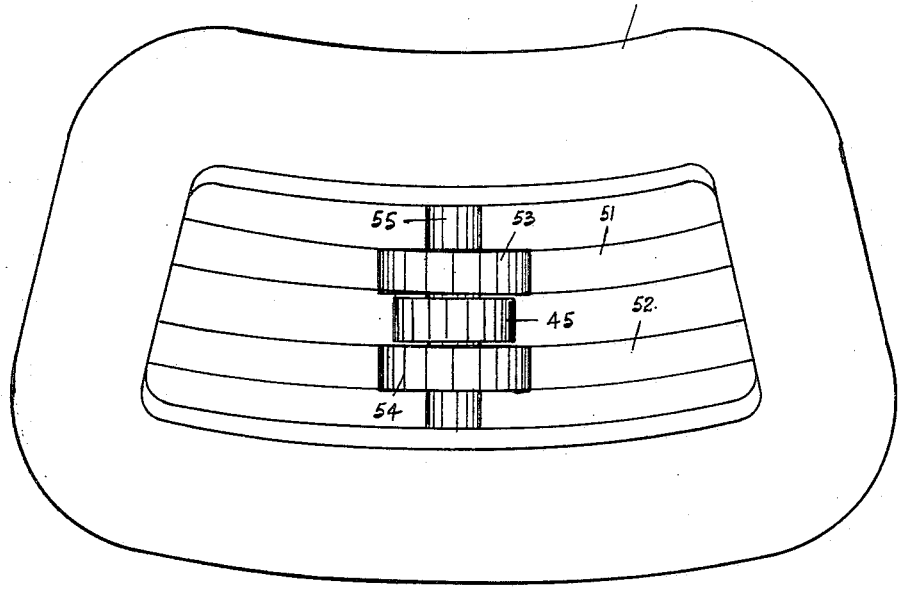
Fig. 6 is a plan view of trolleys and their tracks in the pinion case support.

It may be pointed out in the first place that this invention particularly concerns train lighting systems of the axle drive type, in which it will be seen by referring to the drawings that the dynamo or electric current generator 1 is rigidly supported from the body 2 of the car, thereby relieving said dynamo from the vibrations incidental to the carriage of the dynamo by the truck, as is almost universally done at present, mainly, because the only transmission of power, which has been considered as generally suitable is the belt drive, and it is to reduce the cost of maintenance and to insure a more regular generation of current that the present drive by gear wheels has been devised, not that gear mechanisms are by any means unknown in this art, as they have been used with moderate success in several systems, but the problem is the support, and in this invention the combined flexibility and rigidity of this support provide the means of avoiding any dissociation of the main and secondary driving gears herein illustrated, besides it may be stated that other details of construction in this invention facilitate the transmission.

The hangers 3 support said dynamo 1 from the car body frame and the dynamo shaft 4 extends to the universal ball joint 5 said joint 5 at the other side having the shaft 6 projecting from its ball member into the hollow shaft 7 forming a telescopic extensible shaft. The cap 8 of the joint 5 is held by the spring 9 abutting the collar 10, and the hollow shaft 7 is closed by the nut 11 and suitable packing therewithin.

The hollow shaft 7 at its other end receives the shaft 12 from the ball of the joint 13, said shafts 7 and 12 being rigidly secured together, while the coincident rotation of the shafts 6 and 12 is assured by the key 14 on the shaft 7 sliding in a corresponding slot in said shaft 6.

The cap 15 of the joint 13 is held by the spring 16 abutting the collar 17.

The inner side of the joint 13 receives the gear shaft 18 in the socket 19 to which it is rigidly secured.

The main driving gear 20 is preferably formed in halves rigidly secured together on the car axle 21 over the felt packing 22, the latter projecting beyond the gear wheel hub at each side.

The said gear wheel 20 is inclosed by the casing 23, which is also formed in halves and joined by bolts 24 through the horizontal flanges 25 and 26.

The flanges 25 and 26 extend completely around the whole casing which includes the pinion case 27 beyond the axle 21 being the outer portion of the casing, the inner portion 28 of said casing joining said outer portion by means of the encircling rims 29 and 30 engaging the projecting parts of the felt packing 22, thus maintaining the casing perfectly dust tight so far as the joints with the axle are concerned.

The pinion case 27 contains the bearings 31, which are preferably in the form of standard ball bearings and in which the shaft 32 is journaled, said shaft carrying the spur gear pinion wheel 33 coacting with the gear wheel 20.

The bevel gear wheel 34 is rotated with the pinion 33 and is rigidly secured thereto or forms part therewith; in any case, it is fixedly mounted on the same shaft.

The pinion case also contains the bearings 35 at right angles to the bearings 31 the said bearings 35 being of the standard ball pattern and in alinement with the bearing orifice 36 at the outer end of the said pinion case 27.

The shaft 18 is journaled in the bearings 35 and projects through the shaft orifice 36 and enters the socket 19 and is securely fixed therein and the bevel gear 37 is mounted toward the inner end of said shaft 18 and coacts with the bevel gear wheel 34.

The transmitting parts for transferring power from the axle to the dynamo are thus completed and it will be readily understood from the foregoing description that the gear wheel 20 drives the spur pinion 33, thereby rotating the shaft 32 and the gear wheels 34 and 37. The shaft 18, being thus driven, communicates the power through the universal joints and telescopic shaft to the dynamo shaft for the general purposes of this invention.

The felt packing ring 38 encircles the shaft 18 between the bearings 35 and the pinion case, thus providing a dust guard at the outer end of the casing.

The inmost support 39 for the shaft 18 is at the opposite side of the gear 37 from the bearings 35, thereby balancing the shaft and insuring smooth operation.

The lugs 40 are rigidly secured to or integral with the bottom of the pinion case 27 at each side thereof said lugs being pierced for the shaft 41, on which the said pinion case rests.

The shaft 41 projects through corresponding shaft orifices at the lower end of the stirrup 42, therefore, the said stirrup carries the pinion case.

At the upper end the stirrup 42 has a central pin orifice 43, through which the pin 44 extends, said pin at the top terminating in an eye 45 and at the lower end carrying the nut 46 screw-threaded thereon and toward the upper end carrying the nut 47 screw-threaded thereon.

The stirrup 42 is held midway between the nuts 46 and 47 by the springs 48 and 49, the spring 48 being between the nut 47 and the stirrup, and the spring 49 being between the nut 46 and the stirrup, consequently said stirrup is well cushioned which insures a resilient support for said pinion case 27.

The bracket 50, secured to the car beams, supports the arc-shaped trackways 51 and 52, on the rails of which the trolleys 53 and 54 run, said trolleys being connected by the shaft 55. The pin 44 is mounted on the shaft 55 through the eye 45, between the trolleys 53 and 54, therefore the stirrup is supported from said bracket 50, permitting lateral movement to the extent required by the other movement of the truck in the course of its travel and insuring flexibility.

The lugs 56 project from the outer end of the pinion case, forming the frame recesses 57 between themselves and the flanges 25 and 26.

The guiding frame 58 is rigidly secured to the cross bar 59, the latter being rigidly secured to the sides of the truck.

The frame 58 in the recesses 57 holds the pinion case from sidewise movement and consequently, the said shaft 18 is carried with the swinging of the truck, so that the final transmission of the power is accomplished through the telescopic shaft without disturbing the gears in their operation.

In the operation of this invention, the dynamo, which is intended to generate current and in conjunction with electric storage batteries supply current for lighting the railway cars, is hung from the under side of the car body, and therefore the effect of the vibration on said dynamo is minimized.

The universal joints and telescopic shaft permit all changes in the relative positions that may occur in respect to the said dynamo and the said driving gear without affecting the transmission of power.

The mechanism between the shaft 18 and the main driving gear is also flexibly arranged, though the flexibility is guarded or limited, so that no pumping or swinging of the truck frame will have the power to separate any of the meshed gears for a fraction of a second.

To accomplish this the main gear and pinion must be allowed a limited movement in an annular path and this is done by cushioning the stirrup support for the pinion case, and in permitting the latter a limited sliding movement vertically in the guiding frame.

The stirrup support moves readily with the truck by means of its own running gear on the arc-shaped trackways, therefore there is full freedom of movement and no dislocation of the gears in their mountings, thus again it will be seen that the comparative stability of the body is made use of in the said stirrup support, for the parts thereof are hung from said body and are only influenced by the movements of the truck through the weight of the pinion case, as it rests thereon, and the consequent travel of the trolleys on their trackways.

Various changes may occur in the construction without departing from the spirit of the invention, so long as they are within the claims for novelty following.

What I claim is:—

1. In power transmitting devices, an axle driven member, a coacting member, a housing having a bearing for said coacting member, secondary driving members actuated by said coacting member, a flexible shaft rotated through said secondary members and connected with the driven machine, a rigid guiding member limiting the sidewise movements of said housing in relation to its support, and a flexible support for said housing between said guiding member and the axle.

2. In power transmitting devices, a driven axle, a gear wheel mounted on said axle, a casing mounted on said axle in halves and having a pinion case extending therefrom, the front and rear parts of said casing being joined around said axle by rims or flanges, compressible packing between the hub of said gear and said axle and extending out at each side under said rims, a pinion and coacting gear mechanism within said pinion case suitably journaled and having a shaft member projecting outwardly, compressible packing around said shaft between the inner wall of the casing and the shaft bearing, a flexible shaft, and intermediate and outer supports for said casing.

3. In power transmitting devices, a driven axle, a gear wheel mounted thereon, a gear mechanism coacting with said gear wheel, a flexible shaft to the driven machine, a guiding member holding said gear mechanism, and a swinging support independently hung between said guiding member and said axle.

4. In power transmitting devices, a driven axle, a gear wheel mounted thereon, a gear mechanism coacting with said gear wheel, a casing for said gear mechanism and mounted on said axle, a guiding member fixed in relation to said axle and connected with the outer end of said casing, a flexible and swinging intermediate member independently supported and engaging said casing, and a flexible shaft connecting said gear mechanism to the driven machine.

5. In power transmitting devices, a driven axle, a gear wheel mounted thereon, a gear mechanism coacting with said gear wheel, a flexible shaft to the driven machine, a casing inclosing said gear mechanism and mounted on said axle, a guiding frame connected with the outer end of said casing, and a cushioned stirrup supporting said casing and itself independently supported.

6. In power transmitting devices, a car body supported on suitable trucks, a gear wheel mounted on an axle of one of said trucks, a gear mechanism coacting with said gear wheel, a flexible shaft extending from said gear mechanism, a generator rigidly supported from said car body and connected with said flexible shaft, a guiding member rigidly secured to the truck frame and carrying one end of said shaft in unison with the sidewise movements of said truck in relation to said body, and a cushioned supporting member embracing said gear mechanism and itself supported from the said car body.

7. In power transmitting devices, a car body supported on a plurality of trucks, a gear wheel mounted on an axle of one of said trucks, a gear mechanism coacting with said gear wheel, a flexible shaft, a machine supported from the body, a casing mounted on said axle and inclosing said gear wheel and gear mechanism, a cushioned stirrup support from said body and supporting said casing, and a guiding frame connected with the outer end of said casing and rigidly secured to said truck.

8. In power transmitting devices, a car body supported on a plurality of trucks, a gear wheel mounted on an axle of one of said trucks, a gear mechanism coacting with said gear wheel, a flexible shaft from said gear mechanism, a machine connected with said flexible shaft and rigidly supported from said body, a casing inclosing said gear wheel and mechanism and mounted on said axle and having lugs at the outer end, a guiding frame within said lugs and forming a vertical slide for the outer end of said casing, and an intermediate cushioned support embracing said casing between the axle and said frame.

9. In power transmitting devices, a car body supported on a plurality of trucks, a gear wheel mounted on an axle of one of said trucks, a gear mechanism coacting with said gear wheel, a flexible shaft from said gear mechanism, a machine supported from the car body and driven from said flexible shaft, a casing mounted on said axle and inclosing said gears and having lugs on the under projecting side, a stirrup having its lower bar engaging said lugs, a stirrup pin inserted in the upper end of said stirrup and suitably cushioned therein, a bracket rigid with the car body and having trackways, a carriage connected with said pin and traveling on said trackways, and means rigid with the truck for swinging the casing coincidently with the movements of the truck and carrying said carriage along its trackways back and forth.

10. In power transmitting devices, a car body supported on a plurality of trucks, a gear wheel mounted on an axle of one of said trucks, a gear mechanism coacting with said gear wheel, a flexible shaft, a machine rigidly hung from the car body, a casing mounted on said axle and extending outwardly therefrom to include all of said gear mechanism, a stirrup engaging by its lower bar the outward extension of said casing, a pin inserted through the top of said stirrup, springs above and below the stirrup on said pin and suitably stopped, a shaft engaging said pin, trolley wheels mounted on said pin shaft, a bracket secured to the car body and having arc-shaped trackways for said trolleys, and guiding means engaging said casing and secured to said truck.

11. In power transmitting devices, a car truck, a car body, transmission members suitably incased for transmitting power from an axle of said truck, a vertical slideway rigidly secured to the truck frame and connected with the casing, a sling or stirrup support movably supported on the underside of the car body and engaging the casing between the axle and said slideway, a machine rigid with said body and a flexible driving connection from said transmission member to said machine.

Signed at the city of Montreal, Canada, this 27th day of February, 1918.

WILLIAM ALEXANDER PITT.